Figure 1:
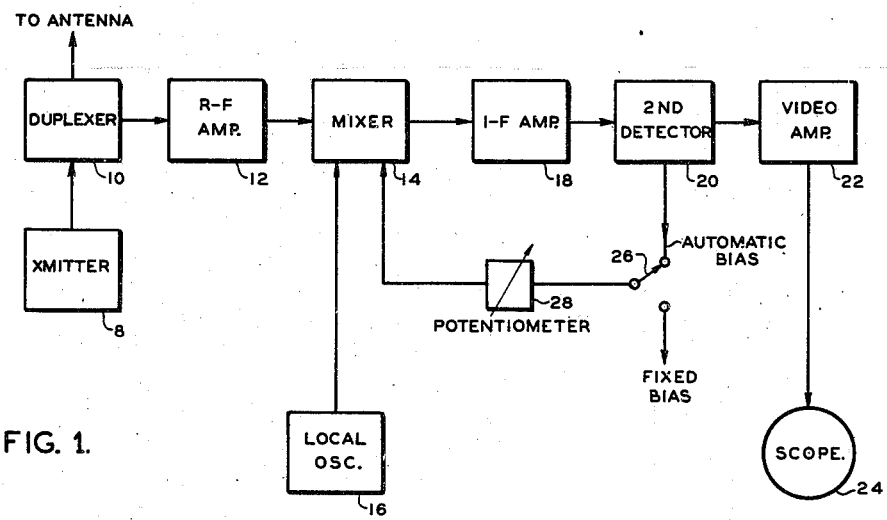

Sept. 23, 1947.  A. C. PRICHARD  2,427,691

NOISE REDUCING IN PULSE RECEPTION

Filed July 26, 1944

INVENTOR.
ARTHUR C. PRICHARD

BY
ATTORNEY

Patented Sept. 23, 1947

2,427,691

UNITED STATES PATENT OFFICE 2,427,691

NOISE REDUCING IN PULSE RECEPTION

Arthur C. Prichard, Long Branch, N. J., assignor to the United States of America, as represented by the Secretary of War Application July 26, 1944, Serial No. 546,725

8 Claims. (Cl. 250—20)

(Granted under the act of March 3, 1883, as amended April 30, 1928; 370 O. G. 757)

The invention described herein may be manufactured and used by or for the Government for governmental purposes, without the payment to me of any royalty thereon.

The present invention relates, generally, to means for reducing the effects of interference in sensitive receivers; particularly receivers adapted for use with pulse-echo object detection systems. More specifically, it relates to signal transmission networks in which sharply rising signals, such as echo signals occurring in a pulse-echo system, are more effectively transmitted than certain types of interfering signals.

In conventional pulse-echo systems, sharp pulses of wave energy, i. e., wave trains of relatively short duration, are periodically transmitted at intervals considerably longer than said duration. When said waves strike a reflecting object, echoes are received. Both the transmitted, or main, pulses and the echo pulses are impressed upon a common receiver having means in the output thereof for measuring the time interval between the main pulses and the echo pulses, whereby the range of the reflecting object may be ascertained.

Since only a minute portion of the energy is reflected, it is necessary to transmit pulses of extremely high peak-power and use very sensitive receivers, if large distances are to be covered. Moreover, such receivers must have wide-band signal channels to adequately resolve the sharp pulses to be handled. Consequently, such receivers, especially the later stages thereof, are likely to be overloaded, or even saturated by strong signals from the transmitter and from nearby reflecting objects and by interfering signals from stations operating on the same or adjacent channels. Even if the receiver has a dynamic range which is adequate for even the strongest echo signals, interfering signals, or the vector sum of the interfering and echo signals are often sufficient to cause overloading or saturation, whereby the receiver is rendered incapable of effectively transmitting the echo signals. Because of the time constants of the receiver circuits, such interfering signals may take an appreciable time to be dissipated, with the result that the receiver remains overloaded for appreciable periods after said signals have ceased, thereby preventing detection of echoes which arrive during such periods.

To avoid this difficulty, it has been the practice to provide a manually-adjustable gain-controlling bias between the grid and cathode of at least one of the tubes in the carrier channels of the receiver. This bias can be adjusted to reduce the amplitude of signals impressed upon the later stages of the receiver and thus prevent overloading. Or, said tube can be back-biased, i. e., biased so that it is below plate-current cut-off, so that the threshold voltage required to render the tube conducting is somewhat less than the peak input voltage. In this condition, the peaks of strong incoming signals are of sufficient amplitude to cause a flow of plate current but insufficient to cause overloading, whereby the dynamic range of the tube is considerably extended. While this method is suitable for any given pulse amplitude, it is not satisfactory where it is desired to observe all incoming echoes, since the weak echoes will be lost when the bias is adjusted to handle a strong signal.

It is a principal object of the present invention to provide an electron tube network for receivers which more effectively transmits desired signals than it transmits other signals modulated at a slower rate than said desired signals. This is done by generating a fast-acting, signal-modulation-responsive, gain-control bias for said channel. The rate of change of said bias, in response to a change of said signal modulation, is such as to more closely follow said other signals than it follows said desired signals. Preferably, said rate of change is made slower than the rate of modulation of said desired signals, i. e., the rate of change of the amplitude of said desired signals, but of the order or, or faster than the rate of change of amplitude of, said other signals, with the result that the latter are to a great extent degenerated.

It is a further object of the invention to reduce the tendency of a pulse receiver to become overloaded by interference, by providing an automatic, relatively fast-acting, gain-control bias which becomes fully active after the occurrence of the desired pulse signals, so that said signals are transmitted before any appreciable bias is developed. Should there be any interfering energy which is more slowly modulated or of longer duration than said desired signals, said bias will be fully effective to substantially degenerate or remove the modulation from said interfering energy.

For a better understanding of the invention, together with other and further objects thereof, reference is had to the following description taken in connection with the accompanying drawings, wherein like parts are indicated by like reference numerals, and its scope will be pointed out in the accompanying claims.

Figure 2:
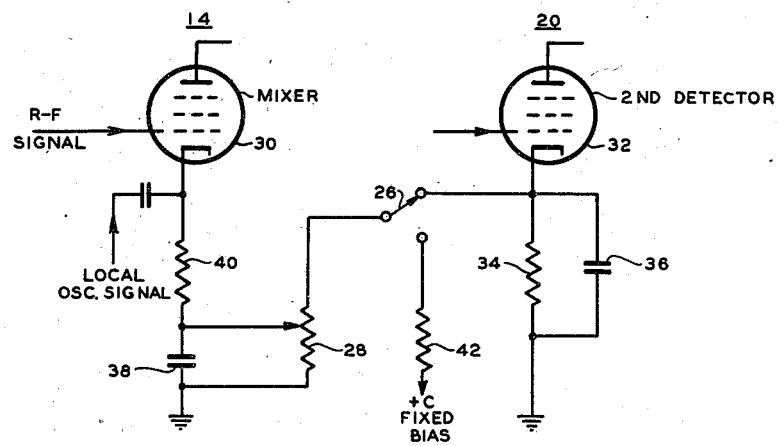

In the accompanying drawings:

Figure 1 is a block diagram of the invention as applied to a conventional pulse-echo receiver; and Figure 2 is a schematic circuit diagram of one form of the invention.

In Figure 1, there is shown a pulse receiver system adapted to be coupled to an antenna through a duplexing circuit 10, to which is also coupled a pulse transmitter 8. Circuit 10 is a well known form of electronic switch which serves to decouple receiver from the antenna during pulse transmission, thus considerably reducing the energy input to the receiver. When transmission of a pulse ceases, said circuit once more couples the antenna to the receiver, thereby permitting reception of incoming echoes.

The receiver is of the superheterodyne type, including a radio frequency (R.-F.) amplifier 12, a frequency changer including a mixer 14 and a local oscillator 16, an intermediate-frequency (I.-F.) amplifier 18, a second detector 20, and a video-frequency amplifier 22 connected to an indicating oscilloscope 24.

To overcome the tendency of strong echo and interfering signals to overload the receiver, a high negative grid-bias can be applied, through the lower position of a switch 26, connected to a source of bias voltage (not shown) and an adjustable potentiometer 28, to any one or more of the early receiver stages, in this case mixer 14. The bias can be adjusted to a point where amplification is so reduced that the signal does not overload or saturate the receiver. If necessary, the bias can be made so high that the tube operates considerably below the point of plate-current cutoff, so that only the peak of the desired pulses will be above the conducting threshold of the tube and will therefore be transmitted. In this manner the dynamic range of the receiver is considerably expanded. However, as above pointed out, adjustment of the bias for any given echo amplitude may result in the loss of weaker echoes.

In accordance with the present invention, a portion of the output of the detector 20 can be used as an automatic gain-control bias, through switch 26 in the upper position. By making this bias relatively fast-acting, so that it substantially follows the signal envelope, and by applying it through a circuit having a suitable time constant, the bias is made most effective slightly after each desired signal-pulse occurs, and thus prevents degeneration of said pulse. On the other hand, the time constant of the bias circuit is still small enough for the bias to become quickly effective when unmodulated or slowly-modulated continuous-wave interference is received with the desired pulse signal. As a result, the interfering component will cause a quick reduction in the gain of the receiver, so that said component will be degenerated to a great extent and the likelihood of receiver overload reduced. Shortly after said interference ceases, the bias disappears, due to the relatively short time constant of the biasing circuit, and the receiver regains its normal sensitivity in time for the next signal pulse.

Figure 2 shows the automatic biasing circuits in greater detail. Tube 30 is the mixer tube in circuit 14, and tube 32 is the detector tube in circuit 20. Signal-responsive bias voltages are developed across a resistor 34, shunted by a capacitor 36, in the cathode circuit of detector tube 32, and impressed, through switch 26 in the upper position, upon potentiometer 28. A portion of the voltage across said potentiometer is then applied as a bias voltage across capacitor 38 in the cathode circuit of mixer 30. The local-oscillator signal is applied across resistor 40 in the cathode circuit, although said signal can be injected in any conventional manner. The R.-F. signal is applied to the input grid of the tube. Capacitor 38 should be of low impedance to the R.-F. and I.-F. signals, but of high impedance to the detected pulse components. It will be seen that a portion of the bias voltage across resistor 34 will be impressed across capacitor 38 in such direction as to render the cathode of tube 30 more positive with respect to ground, and hence more positive with respect to the grid, whereby the gain of the tube will be reduced.

The most desirable value of the time-constant of the R.-C. circuit, including capacitor 38 and a portion of potentiometer 28, as determined by the setting of the slider thereof, depends upon the relative rates of modulation, i. e., the relative rates of change of amplitude, of desired pulse-signals and the interference encountered. Preferably, said time constant should be such that no substantial gain-control bias is developed until after the desired pulses are transmitted. For this purpose, said time constant is set so that the rate of change of bias voltage is less than the rate of change of amplitude of the desired signals, but more nearly equal to, or greater than that of more slowly modulated interfering signals. In general, for a pulse-echo system, said time constant should be a minor fraction, i. e., less than half of the minimum interval between the desired pulses. Preferably, said time constant should be not less than the desired pulse duration and not greater than ten times said duration, although it may be greater or less than this range of values for some operating conditions. By varying the position of the slider of potentiometer 28, the time constant can be varied.

By providing a time constant of the order above discussed, all or part of the desired pulse can be transmitted by the mixer tube before the full biasing voltage is developed, thus preventing degeneration of the desired signals, or removing the modulation therefrom. On the other hand, unmodulated interfering signals, or other signals modulated at a lower rate, i. e., having a lower rate of change of amplitude, than said desired pulses, cause a more or less constant bias to build up to such an extent that a large portion of such signals are degenerated. Thus, when desired signals, in the form of sharply-rising pulses, occur in the presence of such interfering signals, the desired signals are vectorially added to the interfering signals. However, because of the slight delay in build-up of the biasing voltage, all or part of said desired signals get through before the bias is sufficiently increased to prevent it, while the interfering signals are degenerated; with the result that said pulses can be observed on the oscilloscope riding on top of the interfering signal.

An adjustable fixed bias (not shown) may be added in series with the automatic bias in a manner well known in the art, so that the point on the characteristic curve of the tube at which the automatic bias operates can be selected at will.

For most effective operation of the invention above described, it is desirable that the main pulses be substantially completely eliminated from the receiver circuits. A highly effective duplexing circuit should therefore be used in the antenna circuit. As a supplement thereto, if necessary, use may be made of auxiliary expedients, such as one of the main-pulse eliminating circuits described in the copending application of R. F. Schmid, Serial No. 495,716, filed July 22, 1943.

There has been described an automatic biasing means for preventing overload or saturation of a receiver. The automatic bias is made relatively fast-acting, but there is provided a delay in the build-up of said bias for a period which is a minor fraction of the interval between transmitted pulses, but preferably of the order of one to ten times the duration of the desired signal-pulses. Thus, when such pulses occur in the presence of interference which is unmodulated, or modulated at a lower rate than the desired pulses, said pulses are transmitted, while the interference is largely degenerated.

The circuits above described can be modified in various ways. Thus, a separate detector can be used for deriving the bias voltage. The latter can be applied to any tube or combination of tubes in the R.-F., I.-F. and mixer circuits; although the invention is shown applied to a superheterodyne system, it is equally applicable to straight tuned R.-F. systems. It will be obvious to those skilled in the art that various other changes and modifications may be made therein without departing from the invention, and it is, therefore, aimed in the appended claims, to cover all such changes and modifications as fall within the true spirit and scope of the invention.

I claim:

1. In a radio pulse-echo object detection system wherein pulses of wave energy are transmitted at intervals which are greater than the duration thereof, a wave-translating channel having at least one grid-controlled electron tube, and means for reducing the overloading of said channel due to interference, the amplitude of which changes at a lower rate than that of said pulses, said means comprising a detector coupled to the output of said channel for deriving a voltage which substantially follows the modulation envelope of said output energy, a circuit responsive to said voltage for negatively biasing the grid of said tube with respect to its cathode, the time constant of said circuit being such that the time of the full application of bias to said grid is delayed until at least part of each pulse is translated before said bias is fully effective, said time constant being a minor fraction of the interval between said pulses but greater than the duration thereof.

2. In combination with a pulse-echo object detection system wherein spaced pulses of carrier wave energy are transmitted and echo pulses are received, the interval between said transmitted pulses being greater than the duration thereof; a carrier wave translating channel and means to prevent overloading of said channel, said means comprising a detector in the output of said channel for deriving a voltage which substantially follows the pulse envelope and a circuit to which said voltage is applied to vary the output of said channel, said circuit having such time constant that the full application of said voltage is delayed by such an amount of time that at least part of each pulse is translated before the full voltage is applied.

3. The combination set forth in claim 2, wherein said time constant is not greater than ten times the duration of said pulses.

4. The combination set forth in claim 2, wherein said time constant is approximately equal to the duration of said pulses.

5. In combination with a radio pulse-echo object detection system wherein spaced pulses of carrier wave energy are transmitted and echo pulses are received, the interval between said transmitted pulses being greater than the duration thereof; a carrier wave translating channel including a grid-controlled electron tube and means to prevent overloading of said channel, said means comprising a detector in the output of said channel for deriving a voltage which substantially follows the echo pulse envelope, means to apply said voltage to the grid-cathode circuit of said electron tube to vary the output thereof, and means to delay the time of the full application of said voltage by such amount that at least part of said echo pulses are translated before the full voltage is applied.

6. The combination set forth in claim 5, wherein said channel includes a frequency changer, and wherein said electron tube is a part of said frequency changer.

7. The combination set forth in claim 5, wherein said channel is a superheterodyne receiver, and wherein said electron tube is the mixer thereof.

8. The combination set forth in claim 5, wherein said last-named means is a resistance-capacity network having a time constant approximately equal to said pulse duration.

ARTHUR C. PRICHARD.

REFERENCES CITED

The following references are of record in the file of this patent:

UNITED STATES PATENTS

| Number | Name | Date |
| --- | --- | --- |
| 2,154,091 | Holst | Apr. 11, 1939 |
| 2,159,803 | Klotz | May 23, 1939 |
| 2,262,841 | Goddard | Nov. 18, 1941 |
| 2,137,401 | Hobbie | Nov. 22, 1938 |
| 2,161,286 | Delvaux | June 6, 1939 |
| 2,159,240 | Wheeler | May 23, 1939 |
| 2,299,390 | Holmes et al. | Oct. 20, 1942 |